(12) United States Patent
Shin et al.

(10) Patent No.: US 10,666,779 B2
(45) Date of Patent: May 26, 2020

(54) MOBILE TERMINAL WITH COUPLING PORTION AND MOLDING UNIT FOR FIXING AND HEAT RADIATION STRUCTURE

(71) Applicant: LG ELECTRONICS INC., Seoul (KR)

(72) Inventors: Minchul Shin, Seoul (KR); Wooyong Kwon, Seoul (KR); Bohyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 17 days.

(21) Appl. No.: 15/982,557

(22) Filed: May 17, 2018

(65) Prior Publication Data

US 2019/0104211 A1 Apr. 4, 2019

(30) Foreign Application Priority Data

Sep. 29, 2017 (KR) ........................ 10-2017-0127376

(51) Int. Cl.
*H04M 1/00* (2006.01)
*H04M 1/02* (2006.01)

(52) U.S. Cl.
CPC ....... *H04M 1/0264* (2013.01); *H04M 1/0266* (2013.01); *H04M 1/0249* (2013.01); *H04M 1/0262* (2013.01); *H04M 1/0277* (2013.01); *H04M 2001/0204* (2013.01)

(58) Field of Classification Search
CPC ............. H04M 1/0264; H04M 1/0262; H04M 1/0249; H04M 1/0266; H04M 2001/0204
USPC ............................................ 455/575.1–575.8
See application file for complete search history.

(56) References Cited

U.S. PATENT DOCUMENTS

| | | | | |
|---|---|---|---|---|
| 2010/0066937 A1* | 3/2010 | Yamashita | ........... | G02B 6/0085 349/58 |
| 2013/0170156 A1* | 7/2013 | Jung | .................... | H05K 5/0017 361/749 |
| 2015/0155614 A1* | 6/2015 | Youn | ................... | H04M 1/0249 343/702 |
| 2016/0234362 A1* | 8/2016 | Moon | ................. | H04M 1/0202 |

* cited by examiner

*Primary Examiner* — Khoi H Tran
*Assistant Examiner* — B M M Hannan
(74) *Attorney, Agent, or Firm* — Birch, Stewart, Kolasch & Birch, LLP (57) ABSTRACT

A mobile terminal including a display unit; a metal plate having a seating portion supporting a rear surface of the display unit and having a first coupling portion along an edge of the seating portion; a middle case having a second coupling portion covering a lateral surface of the metal plate and forming a gap between the middle case and the first coupling portion of the metal plate; a molding unit inserted in the gap and coupling the middle case and the metal plate to each other; and a rear case coupled to a rear surface of the middle case and defining an exterior of the mobile terminal.

17 Claims, 11 Drawing Sheets

MOBILE TERMINAL WITH COUPLING PORTION AND MOLDING UNIT FOR FIXING AND HEAT RADIATION STRUCTURE

CROSS-REFERENCE TO RELATED APPLICATIONS

This application claims priority to Korean Patent Application No. 10-2017-0127376 filed on Sep. 29, 2017 in Korea, the entire contents of which is hereby incorporated by reference in its entirety.

BACKGROUND OF THE DISCLOSURE

Field of the Disclosure

Embodiments of the present disclosure relate to a mobile terminal a mobile terminal which includes an outer case exposed outside and an inner plate are independently fabricated and a structure configured to improve a waterproof function and a heat radiation function thereof.

Background of the Disclosure

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

By extension, as the functions become expanded, the mobile terminal becomes one of necessary personal belongings and the exterior design then becomes an important factor in determining consumers' product preference. Accordingly, there are increasing needs for the improvement of the exterior design.

Especially, needs for designs using metal are increasing. It is difficult to process a metal material and the metal requires additional cost, so that research and development on a metal case are actively ongoing.

It could not be preferred that metal is used in integrally forming an outer case exposed outside and an inner case with each other, because of diverse properties. Accordingly, the outer case exposed outside and the inner case are independently formed and the coupling structure between the outer and inner cases is continuously researched and developed.

In case the outer case exposed outside and the inner case independently formed from the outer case are coupled to each other, there are active researches and developments on a structure configured to emit the heat generated from an internal space between them and prevent water from permeating there between.

SUMMARY OF THE DISCLOSURE

Accordingly, an object of the present invention is to address the above-noted and other problems and provide a mobile terminal which includes an outer case exposed outside and an inner plate are independently fabricated and a structure configured to improve a waterproof function and a heat radiation function thereof.

Embodiments of the present disclosure may provide a mobile terminal including a display unit; a metal plate comprising a seating portion supporting a rear surface of the display unit; and a first coupling portion projected along an edge of the seating portion backwardly; a middle case comprising a second coupling portion covering a lateral surface of the metal plate to form a gap and projected inwardly to support a rear surface of the first coupling portion; a rear case coupled to a rear surface of the middle case and defining an exterior of the rear surface; and a molding unit insert-molded in the gap and configured to couple the middle case and the metal case to each other.

The molding unit may be in contact with the rear surface of the display unit.

The display unit may comprise a curved edge surface bending backward, and at least one of the seating portion and the molding unit may comprise a curved surface corresponding to the edge curved surface of the display unit.

The metal plate and the middle case may be formed of different materials.

The metal plate may have higher heat conductivity and a lighter weight than the middle case.

The metal plate may be formed of aluminum and the middle case may be formed of SUS or STS.

A first waterproof portion may be provided between the molding unit and the display unit.

The coupling portion may form a step to contact with the molding unit.

The first coupling portion may comprise an unevenness configured to engage with the molding unit and contact with the molding unit.

The middle case may have an end projected inwardly to contact with the molding unit.

The middle case may comprise an unevenness configured to engage with the molding unit and contact with the molding unit.

The first coupling portion may be continuously formed in a vertical direction of the mobile terminal and thicker than the seating portion.

The first coupling portion may be thicker than the second coupling portion.

The second coupling portion may be continuously formed in a vertical direction of the mobile terminal.

A portion of the second coupling portion, which contacts with the first coupling portion, may have a narrow middle area and a wide upper or lower area in the vertical direction of the mobile terminal.

The molding unit may cover an inner surface of the first coupling portion and a rear surface of the second coupling portion, and the molding unit may contact with a front surface of the case.

The molding unit may cover an inner surface of the first coupling portion and a rear surface of the second coupling portion, and the molding unit may comprise a curved surface corresponding to the curved edge surface of the rear case.

The rear case may comprise a curved edge surface bending toward the front surface, and the molding unit may comprise a curved surface corresponding to the curved edge surface of the rear case.

A second waterproof portion may be provided between the molding unit and the rear case.

The first coupling portion and the second coupling portion may be coupled to each other by welding or via a coupling hole, and the molding unit may be insert-molded.

According to the embodiments of the present disclosure, the mobile terminal has following effects.

The case exposed outside and the inner plate of the mobile terminal may be fabricated independently and coupled to each other. They may be made of different materials which are proper to their unique characteristics.

The exposed case and the inner plate are coupled to each other. Accordingly, the waterproof function and the heat radiation function may be enhanced.

The molding unit or the inner plate is easy to realize the curved surface. Accordingly, the user's grip sense of the mobile terminal may be enhanced.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
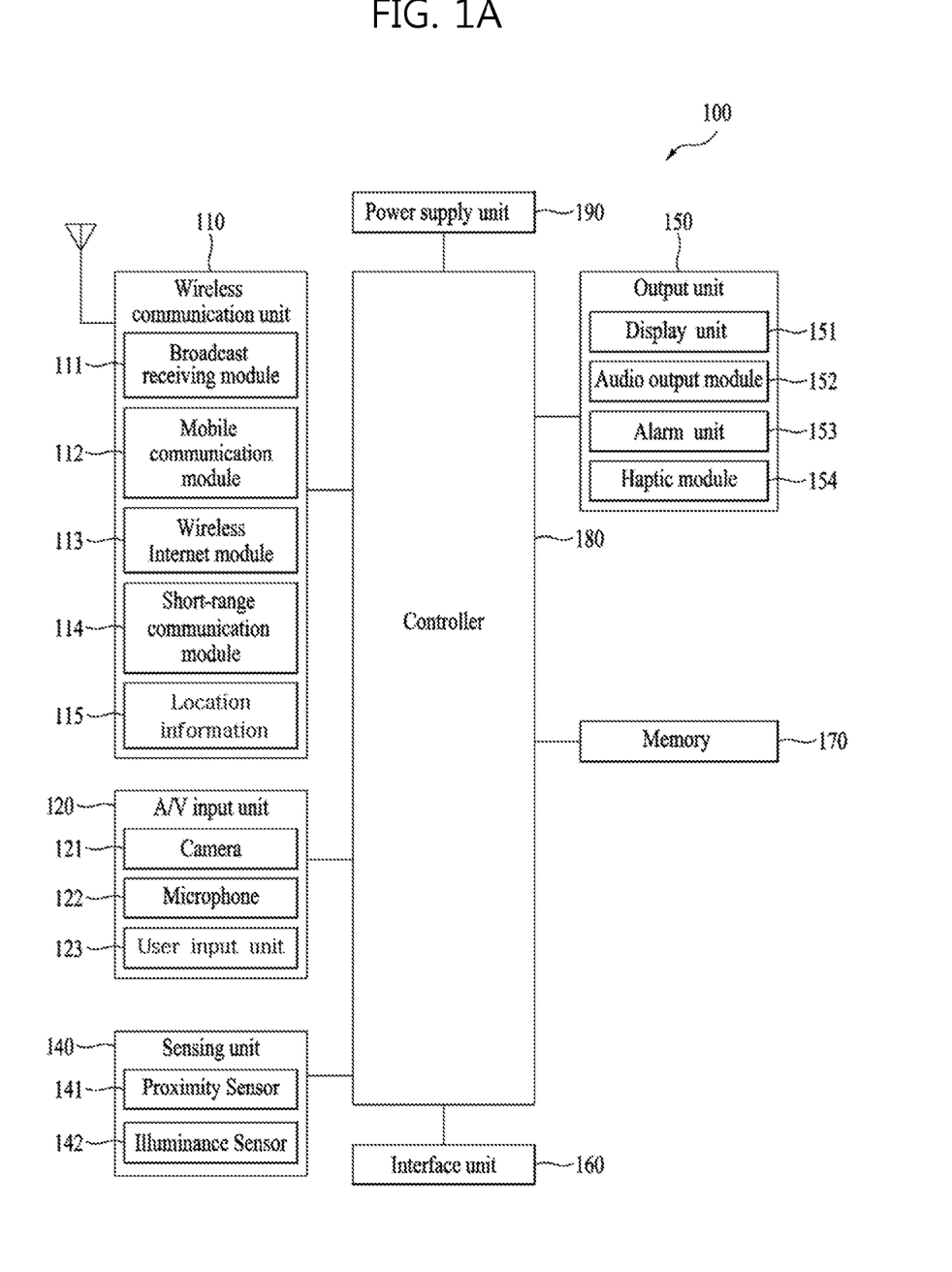
FIG. 1A is a block diagram of a mobile terminal in accordance with the present disclosure.
Figure 1B:
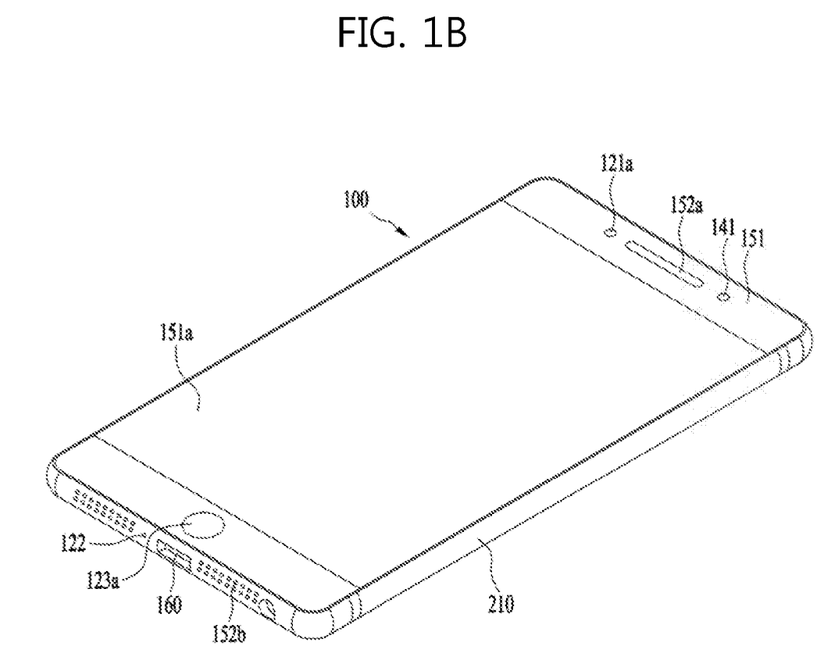
FIGS. 1B and 1C are conceptual views of one example of the mobile terminal, viewed from different directions.
Figure 1C:
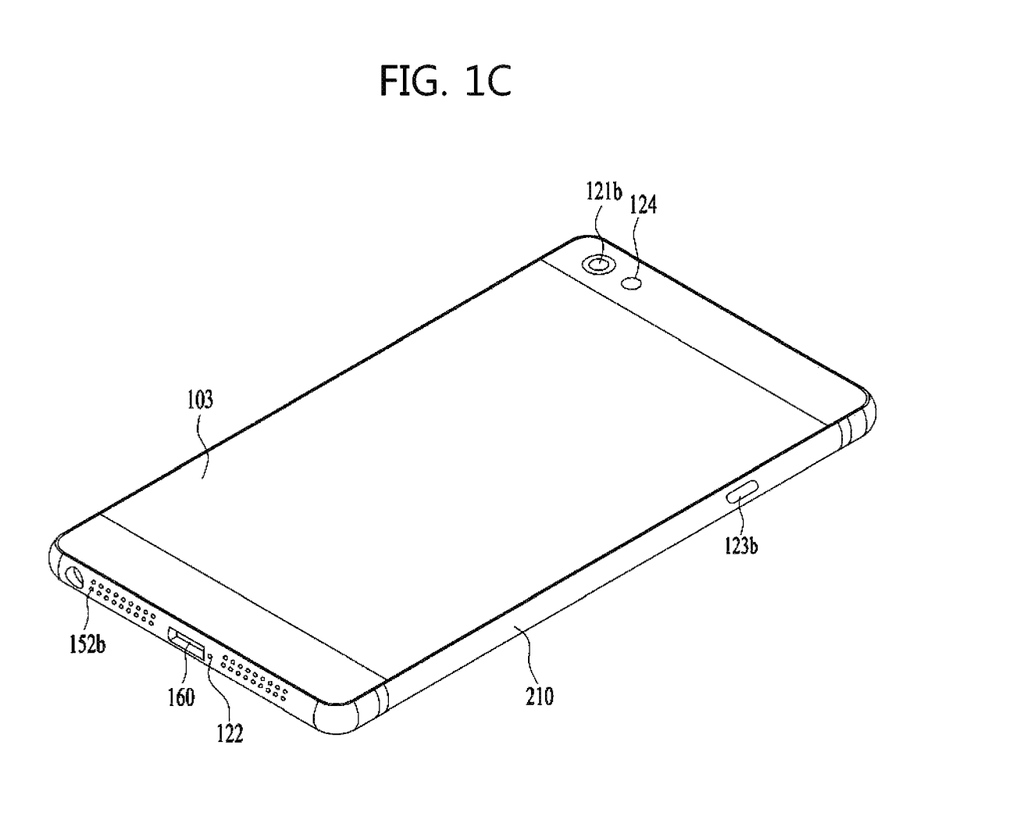

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using the display unit 151 and a rear case 102. Various electronic components are incorporated into a space formed between the display unit 151 and the rear case 102. A middle case 210 may be additionally positioned between the display unit 151 and the rear case 102.

In recent years, as the size of a window 151a of the display unit 151 increases, the window 151a of the display unit 151 can be configured to cover the entire front surface.

The mobile terminal 100 may form a curved surface with a side surface in order to improve a feeling of grip. To this end, the outer surface of the middle case 210 may be formed as a convex surface, or the edge of the display unit 151 may be bent in the back surface direction and coupled to the middle case 210. In addition, the rear case 102 may be formed such that the edge thereof is bent in the front direction.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 210, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and a front case, between the front case and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window of the display unit 151 will typically include an aperture to permit audio generated by the first audio output module 152a to pass. One alternative is to allow audio to be released along an assembly gap between the structural bodies (for example, a gap between the window 151a and the front case. In this case, a hole independently formed to output audio sounds may not be seen or is otherwise hidden in terms of appearance, thereby further simplifying the appearance and manufacturing of the mobile terminal 100.

An optical output module can be configured to output light for indicating an event generation. Examples of such events include a message reception, a call signal reception, a missed call, an alarm, a schedule notice, an email reception, information reception through an application, and the like. When a user has checked a generated event, the controller can control the optical output module to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear cover 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

A terminal 100 according to various embodiments can generate and display various wallpapers on a display unit 151. The terminal 100 can modify the displayed wallpaper according to various modification conditions and display the modified wallpaper on the display unit 151. In this case, the wallpaper may correspond to an image displayed on a lock screen or a home screen of the terminal 100. Hence, the wallpaper may have an image form, a video form, or a form in which an image and a video are mixed. The modification condition may correspond to a modification period. Regarding this, it shall be explained in detail in the following.

Figure 2:
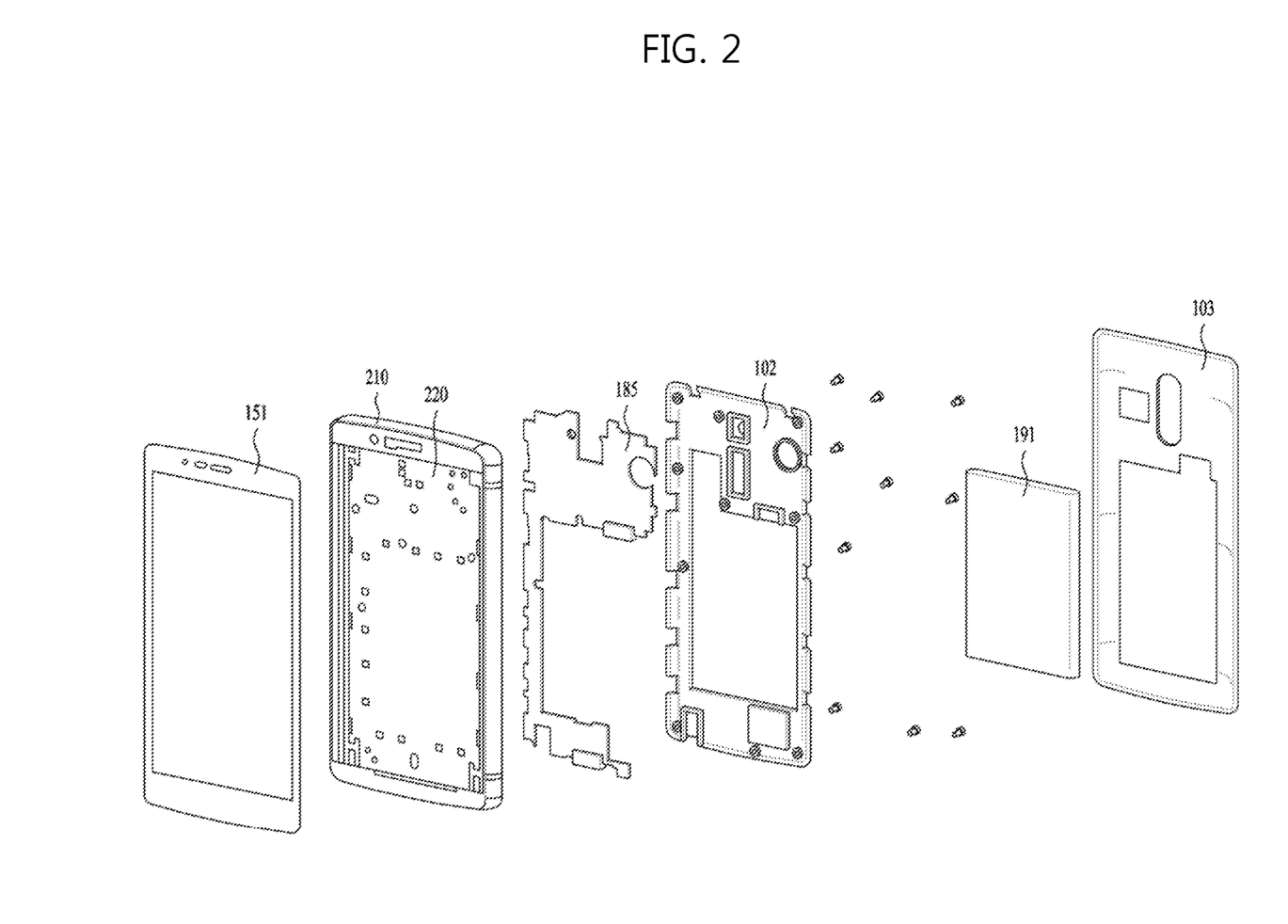
FIG. 2 is an exploded perspective diagram of the mobile terminal.

FIG. 2 is an exploded perspective diagram of the mobile terminal and the terminal 100 can include a metal plate 220 for supporting the back surface of the display unit 151. Various components such as a printed circuit board 185 and the battery 191 can mounted on the rear surface of the metal plate 220. The middle case 210 can cover the side surface of the metal plate 220. Rear case 102 and battery or rear cover 103 can be combined to the middle case 210 and cover the components mounted on the rear surface of the metal plate 220.

The display unit 151 is shown located on the front side of the terminal body to output information. As illustrated, the display unit 151 can be front surface of the terminal body together with the front case.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 210, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

Figure 3:
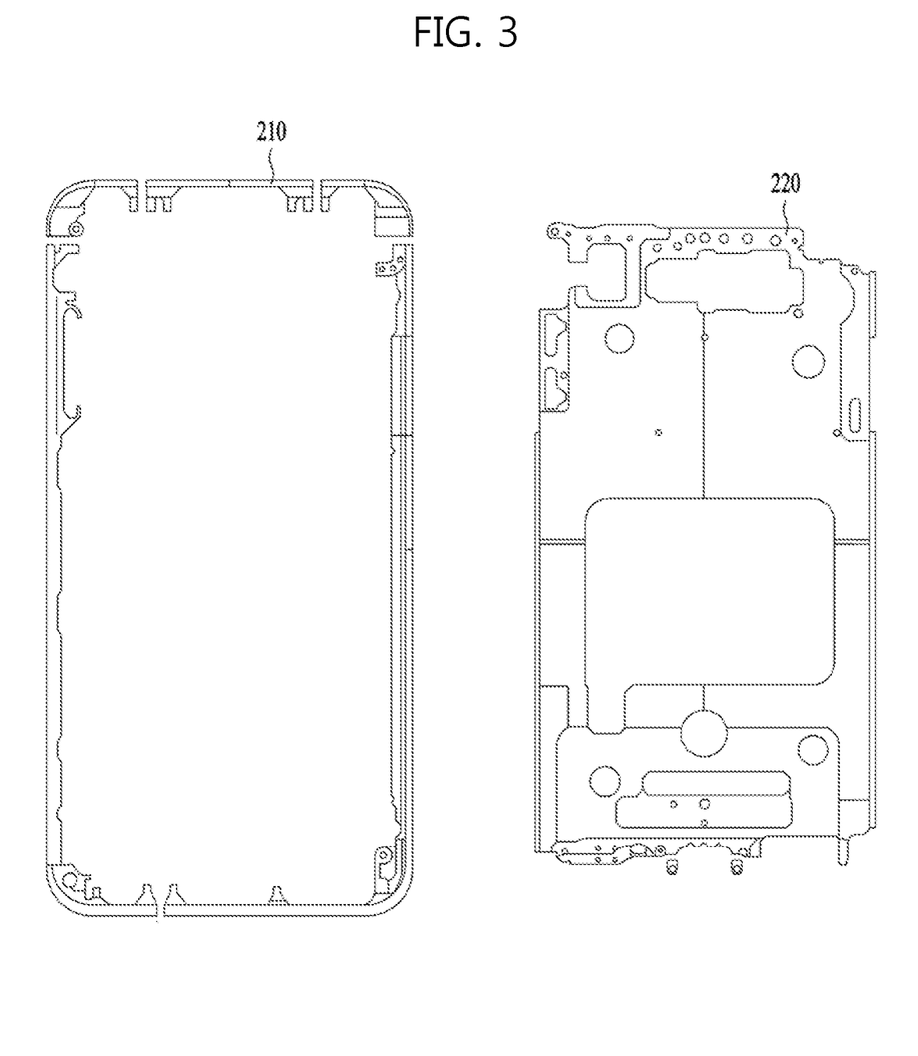
FIGS. 3 and 4 include a front view illustrating some components provided in the mobile terminal and a perspective diagram illustrating the coupling of the components.

FIG. 3 is a front view illustrating a metal plate 220 supporting a rear surface of the display unit 151 provided in the mobile terminal and a middle case 210 surrounding a lateral surface of the metal plate 220 and defining an exterior of a lateral surface provided in the mobile terminal.

A process for forming the exterior of the middle case 210 and smoothing the surface to improve gloss is additionally performed to the middle case 210 including a metallic material. Examples of the process for smoothing the metallic surface include NC processing, sanding process and PVD (Physical Vapor Deposition) processing.

The metal plate 220 including metal requires a structure configured to closely contact with the rear surface of the display unit 151 so as to reduce the volume and the waterproof effect. In this instance, the display unit 151 has a structure configured to curve an edge backward to enhance a grip sense with respect to the lateral surface and requires the curved surface processing performed to the metal plate 220 facing the rear surface of the display unit 151.

The middle case 210 defines the exterior and the metal plate 220 is provided in the mobile terminal and requires the surface processing. Considering that, the middle case 210 and the metal plate 220 require different material characteristics, respectively. Accordingly, the middle case 210 and the metal plate 220 are made of different materials and then coupled to each other.

The metal plate 220 is provided in the mobile terminal and configured to transmit the heat generated in the mobile terminal outside, so that it may be formed of metal with high heat conductivity.

The metal plate 220 requires the curved surface process for closely contacting with the rear surface of the display unit 151, so that it may be formed of metal with good cutting performance or machinability.

Meanwhile, the middle case 210 is configured to be directly exposed outside and then formed of metal with easy gloss.

Accordingly, the metal plate 220 may be formed of aluminum and the middle case 210 may be formed of SUS or STS. Aluminum has high heat conductivity and easy to perform the curved surface processing, with a light weight. SUS or STS is easy to make gloss and proper to be form the middle case 210 directly exposed outside.

The middle case 210 and the metal plate 220 formed of the different metals might have a weak coupled area or a disadvantage of water permeation through the coupled area. Accordingly, the middle case 210 and the metal plate 220 may be coupled to each other through a molding unit 230 by injection molding.

Figure 4:
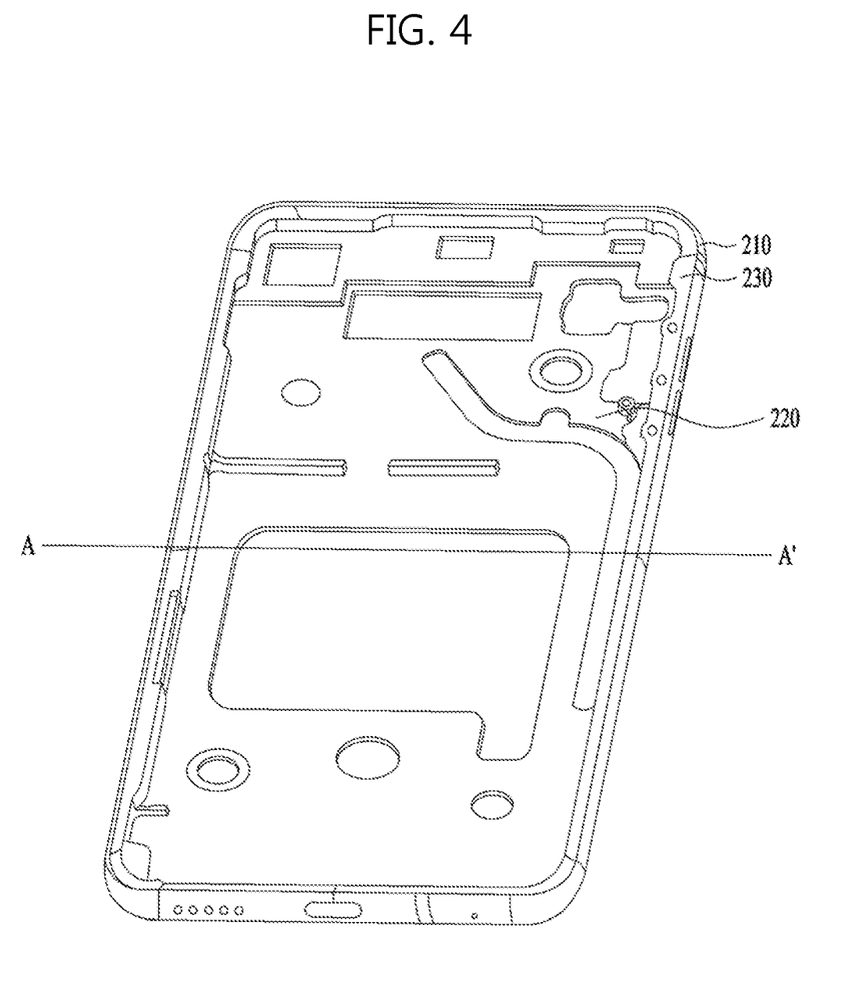

FIG. 4 is a perspective diagram of the middle case 210 and the metal plate 220 coupled through the molding unit 230, viewed from a rear direction.

The molding unit 230 is injection-molded between the middle case 210 and the metal plate 220.

The molding unit 230 may be continuously formed along an inner surface of the middle case 210. At this time, the molding unit 230 may be in contact with the rear surface of the display unit 151 and the front surface of the rear case 102, so as to prevent water from permeating into the mobile terminal.

The molding unit 230 is formed by the injection molding so that it may be easy to realize the curved surface. When the display unit 151 includes a curved surface bending toward the rear surface or the rear case 102 includes a curved surface bending toward the front surface, the molding unit 230 may have a curved surface in contact with the display unit 151 and the rear case 102.

Figure 5:
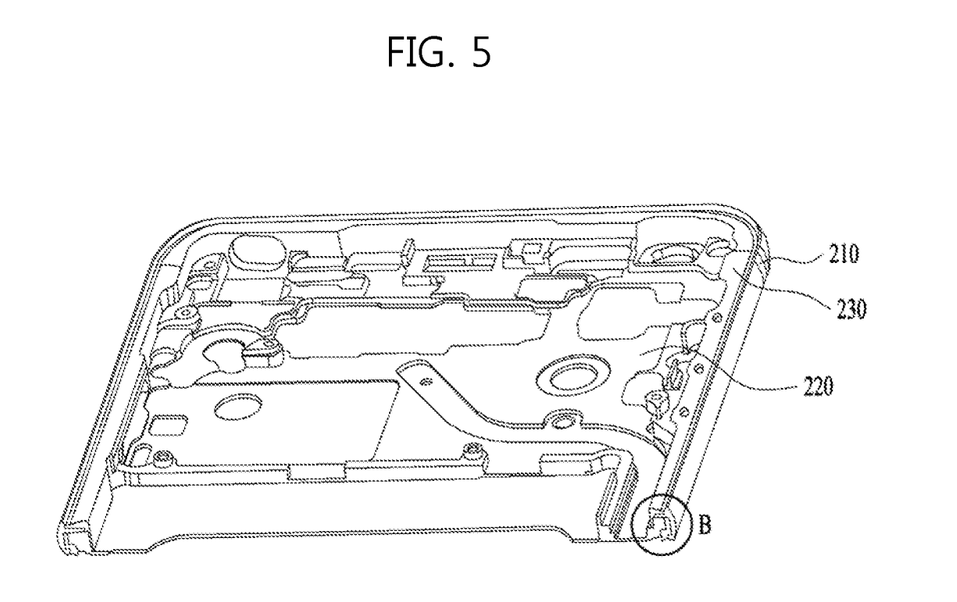
FIG. 5 is a perspective diagram partially illustrating the components, with a cut-away surface along A-A' of FIG. 4.

FIG. 5 is a perspective diagram having a cut-away surface along A-A' shown in FIG. 4. Hereinafter, the structure configured to couple the middle case 210 and the metal plate 220 to each other through the molding unit 230 will be described in detail by enlarging "B" shown in FIG. 5.

Figure 6:
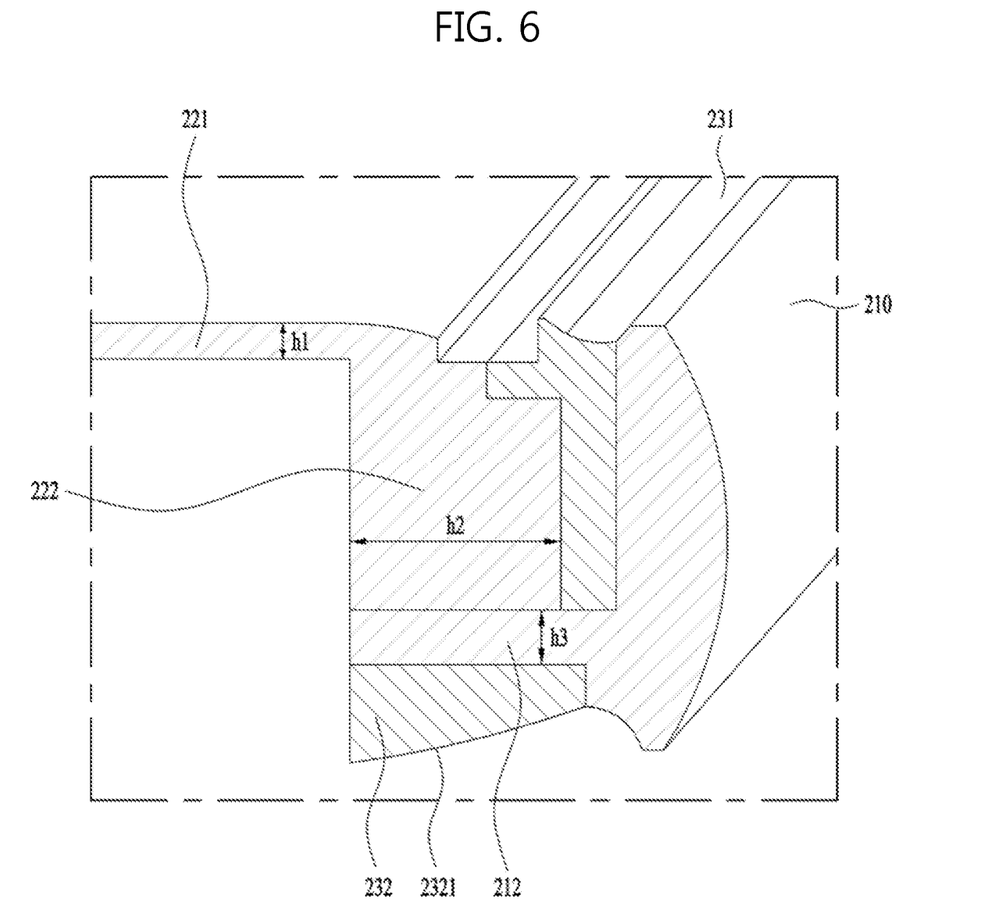
FIG. 6 is an enlarged view partially illustrating 'B' shown FIG. 5.
Figure 7:
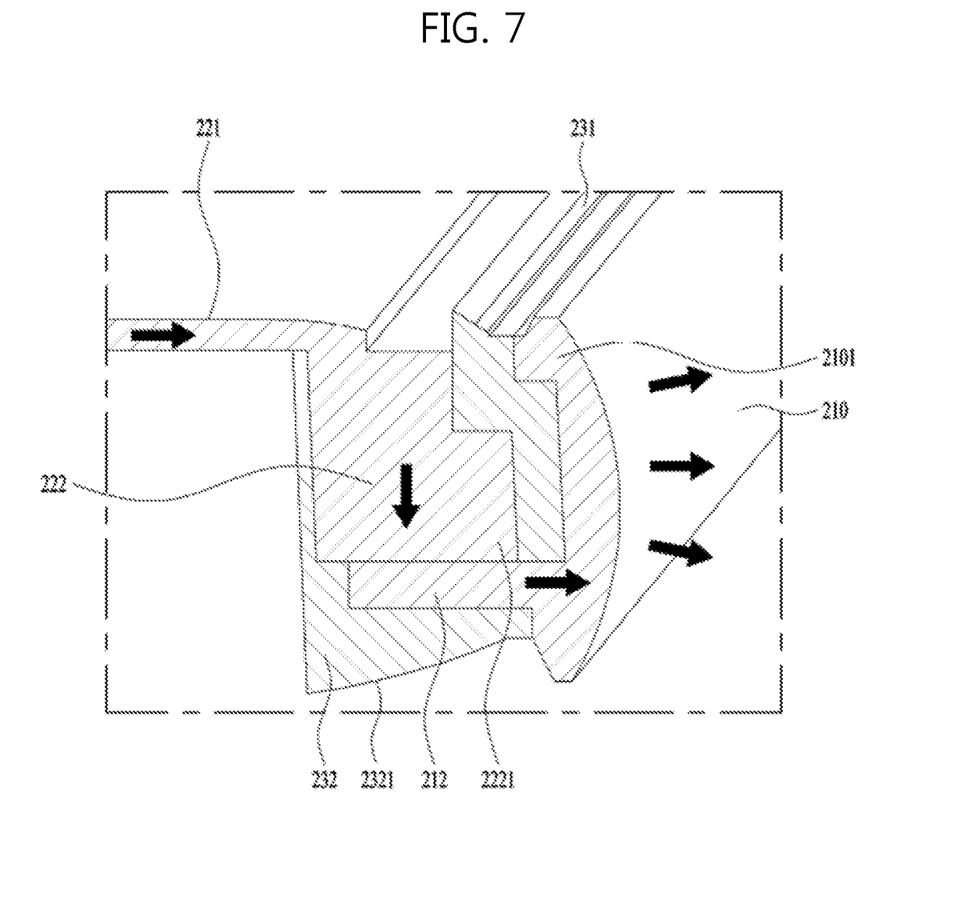
FIG. 7 is a diagram illustrating another embodiment of 'B' shown in FIG. 5.

FIGS. 6 and 7 are partially enlarged views of "B" shown in FIG. 5.

The metal plate 220 supporting the rear surface of the display unit 151 may include a seating portion 221 in close contact with the rear surface of the display unit 151; and a first coupling portion 222 projected backwardly along an edge of the seating portion 221.

The middle case 210 may include a second coupling portion 212 surrounding a lateral surface of the metal plate 220, with a gap, and projected inwardly to support a rear surface of the first coupling portion 222. In this instance, the middle case 210 is formed to surround the lateral surfaces of the display unit 151.

The molding unit 230 is insert-molded in the gap to couple the middle case 210 and the metal plate 220 to each other. For easy explanation sake, a portion of the molding unit 230 insert-molded in the gap formed between the middle case 210 and the metal plate 220 is defined as a coupling molding portion 231. The coupling molding portion 231 is configured to prevent the heat of the middle case 210 from being directly transmitted to the lateral surface of the metal plate 220 and water from permeating between the middle case 210 and the metal plate 220. In addition, the coupling molding unit 230 is insert-molded only to strengthen the coupling force between the middle case 210 and the metal plate 220.

The coupling molding portion 231 is inserted in the space spaced apart between the middle case 210 and the metal plate 220 and configured to form one surface which is in contact with the front surface of the display unit 151.

The display unit 151 includes a curved edge surface bending backwardly. At least one of the seating portion 221 and the coupling molding portion 231 may include a curved surface corresponding to the curved edge of the display unit 151.

The metal plate 220 and the middle case 210 are fabricated independently so that the metal plate 220 may be formed of metal with good cutting performance. The seating portion 221 of the metal plate 220 and the coupling molding portion 231 formed by plastic injection-molding may be easy to perform the curved surface fabrication.

The coupling molding portion 231 may include a first waterproof portion (not shown) provided in the surface facing the rear surface of the display unit 151.

At least one of the coupling molding portion 231 and the middle case 210 may include an unevenness 2221 and 2101 which is formed in the surface facing the molding unit 230 and 231. More specifically, the surface of the first coupling portion 222 which faces the coupling molding portion 231 may include a first unevenness 2221 projected outwardly.

The first coupling portion 222 may form a step by using the first unevenness 2221 and contact with the coupling molding portion 231, so as to enlarge the area in contact with the coupling molding portion 231.

The middle case 210 may include a second unevenness 2101 projected from the surface facing the coupling molding portion 231 inwardly. The second unevenness 2101 may be projected from one end of the middle case 210 inwardly to contact with the coupling molding portion 231. The second unevenness 2101 is configured to enlarge the contact area between the molding unit 230 and 231 and the middle case 210 and enhance the coupling force by fixing the coupling molding portion 231.

The molding unit 230 may include the portion insert-molded in a rear surface of the second coupling portion 212 and the portion is defined as the supporting molding portion 232 for easy convenience sake.

The rear case 102 may include a curved edge surface bending toward the front surface and the supporting molding portion 232 may include a curved surface 2321 corresponding to the edge curved surface of the rear case 102.

The supporting molding portion 232 may include a second waterproof portion (not shown) provided in the surface facing the rear case 102 to enhance the waterproof effect.

Figure 8:
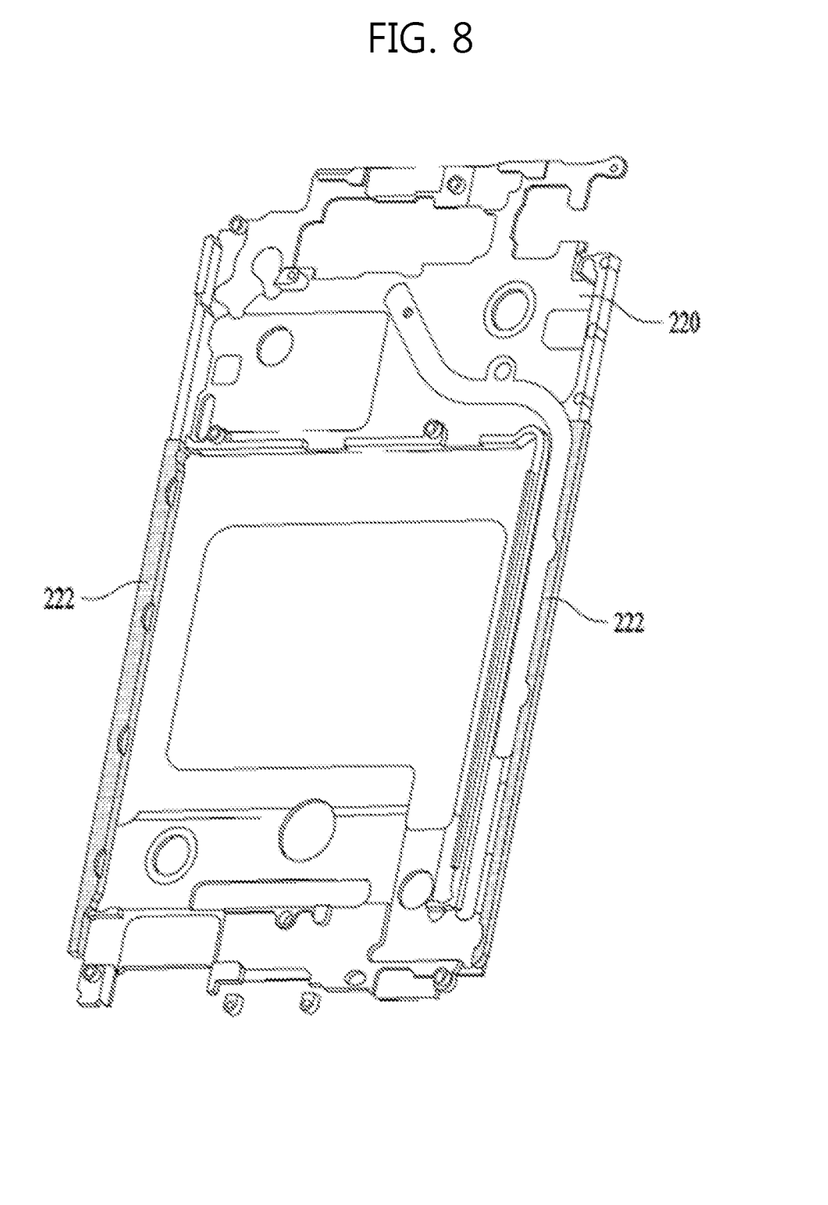
FIG. 8 is a perspective diagram illustrating some components of the mobile terminal.

FIG. 8 is a perspective diagram of the metal plate 220, viewed in a rear direction. Hereinafter, referring to FIGS. 6 through 8, the heat radiation structure of the mobile terminal will be described.

The heat generated in the mobile terminal is transmitted to the first coupling portion 222 from the seating portion 221 and then to the second coupling portion 212 from the first coupling portion 222, to be emitted to the outer surface of the mobile terminal.

At this time, the coupling molding portion 231 has a low heat transmission coefficient enough to partially shut off the heat radiated to the outer surface of the mobile terminal.

The first coupling portion 222 is continuously formed in the edge of the metal plate 220 along a vertical direction so that the heat generated in the mobile terminal may be induced to be emitted in the vertical direction of the mobile terminal.

In this instance, the thickness (h2) of the first coupling portion 222 may be larger than the thickness (h1) of the seating portion 221. Heat transfer rate is in proportion to the cross section area which heat passes through so that the first coupling portion 222 may serve as the passage of the heat generated in the mobile terminal.

Considering the user's habits of holding a lateral portion of the mobile terminal while using the mobile terminal, the structure configured to emit the internal heat in the vertical direction of the mobile terminal can reduce the inconvenience the user might feel in using the mobile terminal for a long time.

Moreover, the thickness (h2) of the first coupling portion 222 may be larger than the thickness (h3) of the second coupling portion 212. In other words, the heat generated in the mobile terminal emitted to the lateral surface of the middle case 210 after transmitted to the first and second coupling portions 222 and 212 may be reduced and the heat may be induced to be emitted along the first coupling portion 222 vertically.

The second coupling portion 212 is projected inwardly to differentiate the width of the surface facing the first coupling portion 222 in the vertical direction so that the rate of the heat transferred to a specific area of the lateral surface of the mobile terminal may be reduced.

More specifically, the portion of the second coupling portion 212, which faces the first coupling portion 222, has a narrow middle area and a wide upper or lower area in the vertical direction. The user of the mobile terminal typically tends to grasp a middle or lower area of the lateral surface of the mobile terminal in the vertical direction. In other words, the user's inconvenience may be reduced by reducing the heat transfer rate emitted via the lateral surface directly touched by the user.

The second coupling portion 212 may be continuously formed along the first coupling portion 222 in a vertical direction. In this instance, the coupling molding portion 231 contacts with the middle case 210 facing only one surface of the first coupling portion 222, only to weaken the coupling force.

At this time, the supporting molding portion 232 may be formed while covering the inner surface of the first coupling portion 222 projected backwardly and the rear surface of the second coupling portion 222.

More specifically, the molding unit 230 continuously insert-molded along the inner surface of the middle case 210 to couple the middle case 210 and the metal plate 220 to each other may include the coupling molding portion 231 and the supporting molding portion 232, only to enhance the coupling force between the middle case 210 and the metal plate 220 in the shape covering the first and second coupling portions 222 and 212. The force applied to the coupling portion by distortion may be dispersed to the coupling molding portion 231 and the supporting molding portion 232, only to prevent the separation between the middle case 210 and the metal plate 220.

The molding unit 230, 231 and 232 may be formed of a material with a low heat transfer coefficient so as to induce the heat along the first coupling portion 222 in the vertical direction of the mobile terminal and adjust the heat transfer rate of the heat emitted to the lateral surface of the middle case 210 via the second coupling portion 210.

Figure 9:
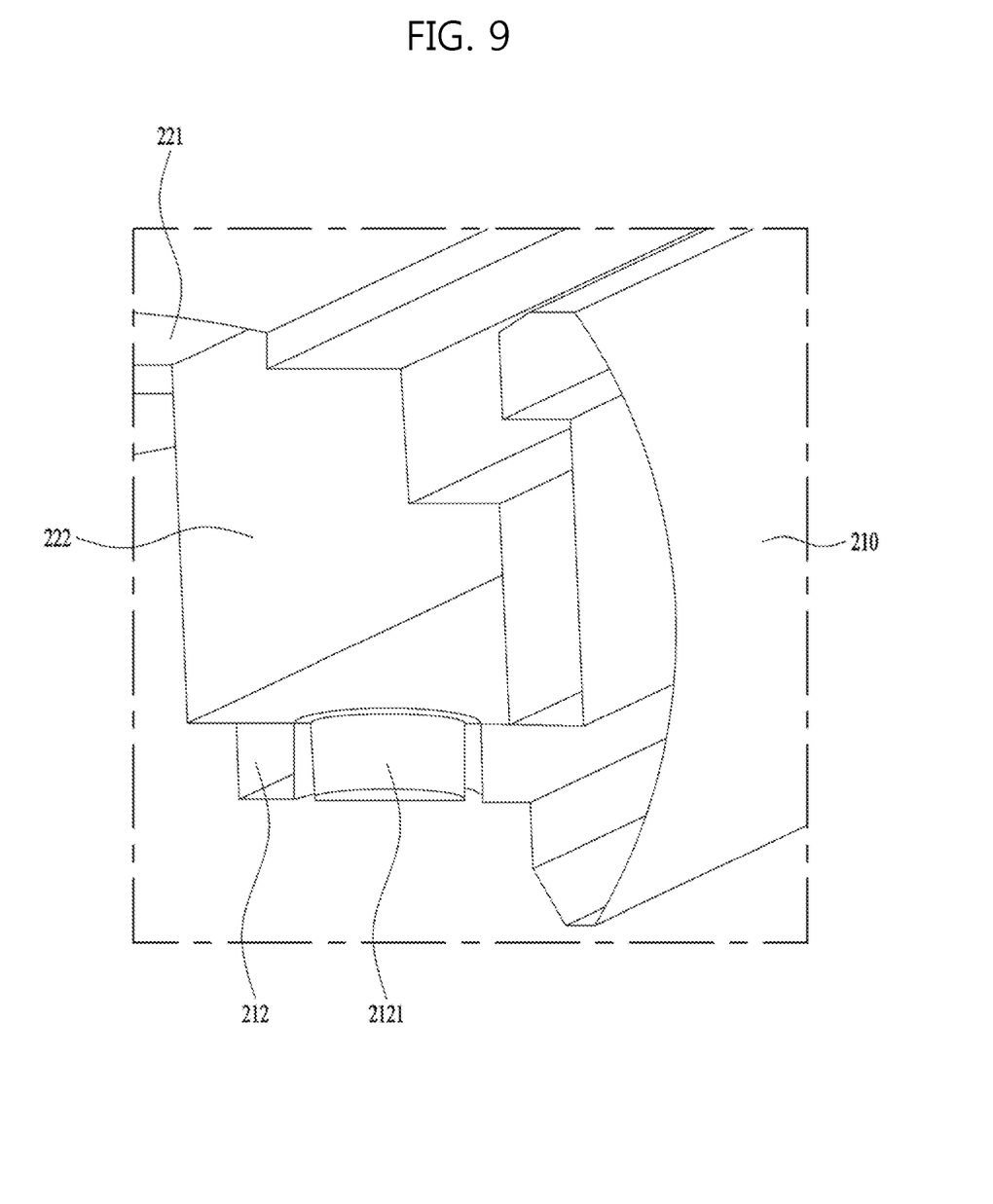
FIG. 9 is a diagram illustrating a further embodiment of 'B' shown in FIG. 5.

FIG. 9 is a sectional diagram illustrating one embodiment of the coupling between the first coupling portion 222 and the second coupling portion 212 via a coupling hole 2121.

The contact surface of the first coupling portion 222 may be welded with or coupling to the contact surface of the second coupling portion 212 via a coupling hole 2121. At this time, the first coupling portion 222 and the second coupling portion 212 are welded with each other or secured via the coupling hole 2121. The molding unit 230 may be insert-molded to strengthen the coupling force between the middle case 210 and the metal plate 220.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising: a display unit;
a metal plate having a seating portion supporting a rear surface of the display unit and having a first coupling portion along an edge of the seating portion;
a middle case surrounding a side of the metal plate and having a second coupling portion covering a lateral surface of the metal plate; and
a rear case coupled to a rear surface of the middle case and defining an exterior of the mobile,
wherein the middle case is configured to form a gap between an inner side of the middle case and an outer side of the first coupling portion and be fixed to the metal plate based on a molding unit inserted in the gap,
wherein the first coupling portion is continuously formed in the edge of the seating portion along a vertical direction,
wherein a thickness of the first coupling portion of the metal plate is greater than a thickness of the seating portion of the metal plate, and
wherein the molding unit is formed of a material with low heat transfer coefficient to induce heat along the first coupling portion.

2. The mobile terminal of claim 1, wherein the molding unit contacts the rear surface of the display unit.

3. The mobile terminal of claim 2, wherein the display unit comprises a curved edge surface, and
wherein at least one of the seating portion and the molding unit comprises a curved surface corresponding to the curved edge surface of the display unit.

4. The mobile terminal of claim 1, wherein the metal plate and the middle case are formed of different materials.

5. The mobile terminal of claim 4, wherein the metal plate has a higher heat conductivity and a lighter weight than the middle case.

6. The mobile terminal of claim 5, wherein the metal plate is formed of aluminum and the middle case is formed of SUS or STS.

7. The mobile terminal of claim 1, wherein the first coupling portion of the metal plate includes a step portion supporting the molding unit.

8. The mobile terminal of claim 1, wherein the second coupling portion of the middle case projects inwardly to support the first coupling portion of the metal plate and support the molding unit.

9. The mobile terminal of claim 1, wherein a thickness of the second coupling portion of the middle case contacting the first coupling portion is thinner than the thickness of the first coupling portion of the metal plate such that generated heat transfers to the seating portion of the metal plate, transfers to the first coupling portion of the metal plate, and transfers to the second coupling portion of the middle case to an outer portion of the mobile terminal.

10. The mobile terminal of claim 1, wherein the molding unit covers an inner surface of the first coupling portion of the metal plate and a rear surface of the second coupling portion of the middle case, and
wherein the molding unit contacts a front inner surface of the middle case.

11. The mobile terminal of claim 10, wherein the rear case comprises a curved edge surface bending toward a front surface of the middle case, and the molding unit comprises a curved surface corresponding to the curved edge surface of the rear case.

12. The mobile terminal of claim 10, wherein the first coupling portion and the second coupling portion are coupled to each other by welding or via a coupling hole, and
wherein the molding unit is insert-molded into the gap.

13. The mobile terminal of claim 1, further comprising:
a printed circuit board and a battery mounted on a rear surface of the metal plate.

14. The mobile terminal of claim 13, wherein the rear case covers the printed circuit board.

15. The mobile terminal of claim 1, wherein the first coupling portion includes a stepped portion and the molding unit includes a protrusion portion seated on the stepped portion.

16. The mobile terminal of claim 1, wherein a heat transmission coefficient of the molding unit is lower than a heat transmission coefficient of the metal plate such that heat transferred from the metal plate is transferred to the second coupling portion of the middle case.

17. The mobile terminal of claim 1, wherein the molding unit is sandwiched between the first coupling portion of the metal plate, the second coupling portion of the middle case and an inner front surface of the middle case in the gap such that the metal plate is coupled to the middle case.

* * * * *